United States Patent
Wang (10) Patent No.: US 12,438,460 B1
(45) Date of Patent: Oct. 7, 2025

(54) POWER MANAGEMENT CIRCUIT CAPABLE OF REDUCING POWER CONSUMPTION OF ELECTRONIC DEVICES

(71) Applicant: Novatek Microelectronics Corp., Hsinchu (TW)

(72) Inventor: Wei-Lun Wang, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/797,486

(22) Filed: Aug. 7, 2024

(51) Int. Cl.
*H02M 3/156* (2006.01)
*G09G 5/00* (2006.01)

(52) U.S. Cl.
CPC .............. *H02M 3/156* (2013.01); *G09G 5/00* (2013.01); *G09G 2330/021* (2013.01)

(58) Field of Classification Search
CPC .......... G09G 2330/021; H02M 3/1582; H02M 3/156; H02M 3/158
See application file for complete search history.

(56) References Cited

U.S. PATENT DOCUMENTS

| | | | |
|---|---|---|---|
| 6,317,839 B1 | 11/2001 | Wells | |
| 7,130,237 B2 | 10/2006 | Kwak | |
| 7,518,940 B2 | 4/2009 | Kwak | |
| 2005/0141321 A1 | 6/2005 | Kwak | |
| 2007/0008789 A1 | 1/2007 | Kwak | |
| 2014/0159686 A1* | 6/2014 | Lee | H02M 3/156 323/282 |
| 2017/0309246 A1* | 10/2017 | Lee | H02M 3/1584 |
| 2017/0338662 A1 | 11/2017 | Sutton et al. | |
| 2020/0090576 A1* | 3/2020 | Lim | G09G 3/2092 |

FOREIGN PATENT DOCUMENTS

| | | |
|---|---|---|
| CN | 104184314 | 12/2014 |
| TW | 546559 | 8/2003 |
| TW | 200522086 | 7/2005 |

OTHER PUBLICATIONS

"Office Action of Taiwan Counterpart Application", issued on Aug. 7, 2025, p. 1-p. 7.

* cited by examiner

Primary Examiner — Yuzhen Shen
(74) Attorney, Agent, or Firm — JCIPRNET (57) ABSTRACT

A power management circuit including a control circuit and a blanking detecting circuit is provided. The control circuit is configured to output a control signal to control a power conversion operation of a power converter circuit. The blanking detecting circuit is coupled to the control circuit. The blanking detecting circuit is configured to receive a plurality of clock signals, detect a disable state of the clock signals, and turn off the control circuit when the disable state of the clock signals is detected.

18 Claims, 6 Drawing Sheets

POWER MANAGEMENT CIRCUIT CAPABLE OF REDUCING POWER CONSUMPTION OF ELECTRONIC DEVICES

BACKGROUND

Technical Field

The invention relates to an electronic circuit and an operating method, more specifically, to a power management circuit and a power management method.

Description of Related Art

Display devices typically include power management integrated circuits (PMICs) to manage the power supply to display panels. When power is applied to the PMICs, switching signals are generated corresponding to the output power. Regardless of whether the display panels are performing display operations, the PMICs always output power to the display panels. Even when no power is required for the display panels, the switching signals are continuously generated. Power consumption cannot be reduced.

SUMMARY

The invention is directed to a power management circuit and a power management method, capable of reducing power consumption of electronic devices.

An embodiment of the invention provides a power management circuit including a control circuit and a blanking detecting circuit. The control circuit is configured to output a control signal to control a power conversion operation of a power converter circuit. The blanking detecting circuit is coupled to the control circuit. The blanking detecting circuit is configured to receive a plurality of clock signals, detect a disable state of the clock signals, and turn off the control circuit when the disable state of the clock signals is detected.

An embodiment of the invention provides a power management method adapted to control a power conversion operation of a power converter circuit. The power management method includes: outputting a control signal to control a power conversion operation of a power converter circuit; receiving a plurality of clock signals, and detecting a disable state of the clock signals; and disabling the power conversion operation of the power converter circuit when the disable state of the clock signals is detected.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Embodiments are provided below to describe the disclosure in detail, though the disclosure is not limited to the provided embodiments, and the provided embodiments can be suitably combined. The term "coupling/coupled" or "connecting/connected" used in this specification (including claims) of the application may refer to any direct or indirect connection means. For example, "a first device is coupled to a second device" should be interpreted as "the first device is directly connected to the second device" or "the first device is indirectly connected to the second device through other devices or connection means." In addition, the term "signal" can refer to a current, a voltage, a charge, a temperature, data, electromagnetic wave or any one or multiple signals.

Figure 1:
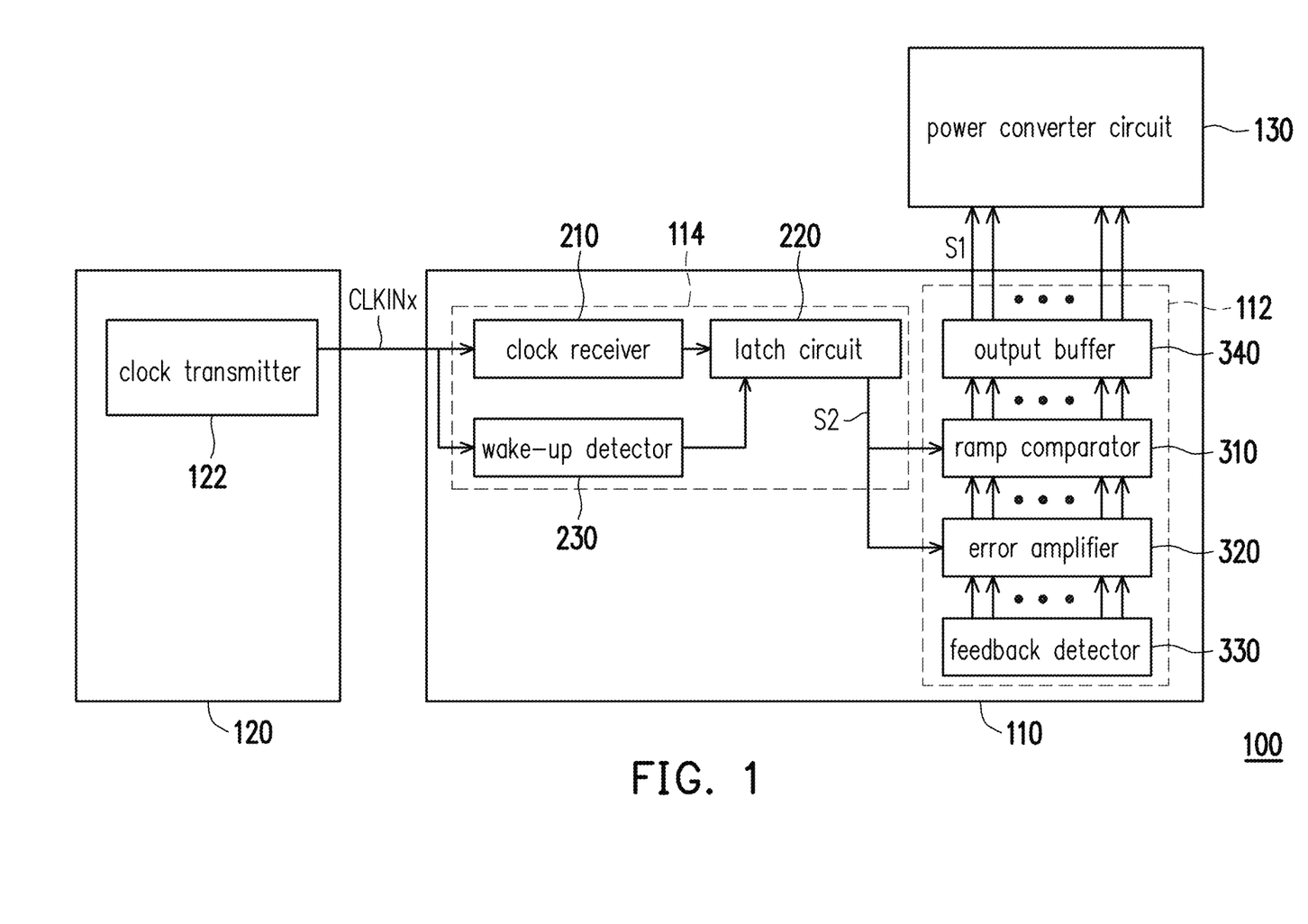
FIG. 1 is a schematic block diagram illustrating an electronic device according to an embodiment of the invention.
Figure 2:
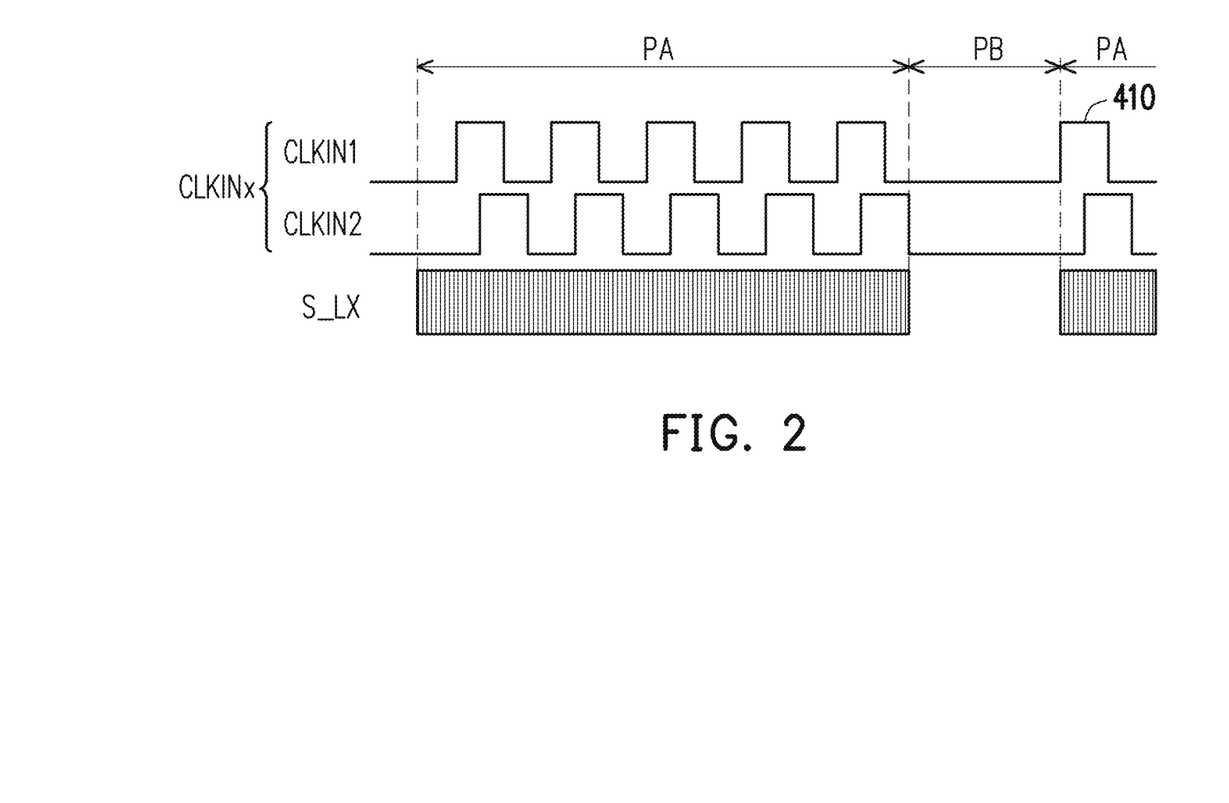
FIG. 2 is a waveform diagram illustrating clock signals and a switching signal according to an embodiment of the invention.

FIG. 1 is a schematic block diagram illustrating an electronic device according to an embodiment of the invention. FIG. 2 is a waveform diagram illustrating clock signals and a switching signal according to an embodiment of the invention. Referring to FIG. 1 and FIG. 2, the electronic device 100 includes a power management circuit 110, a timing controller 120 and a power converter circuit 130. The power management circuit 110 includes a control circuit 112 and a blanking detecting circuit 114. The blanking detecting circuit 114 is coupled to the control circuit 112. In an embodiment, the electronic device 100 may be a display device, and the power management circuit 110 is a power management integrated circuit (PMIC). The types of the electronic device 100 and the power management circuit 110 do not intend to limited the invention.

The control circuit 112 is configured to output a control signal S1 to control a power conversion operation of the power converter circuit 130. In an embodiment, the control signal S1 is a pulse-width modulation (PWM) signal for controlling conduction states of a switch circuit of the power converter circuit 130. The type of the control signal S1 does not intend to limited the invention.

The timing controller 120 includes a clock transmitter 122. The clock transmitter 122 is configured to output a plurality of clock signals CLKINx to the power management circuit 110. The clock signals CLKINx includes at least two clock signals CLKIN1 and CLKIN2, but the number of the clock signals CLKINx does not intend to limited the invention. The blanking detecting circuit 114 is configured to receive the clock signals CLKINx and detect a disable state of the clock signals CLKINx.

To be specific, the blanking detecting circuit 114 includes a clock receiver 210, a latch circuit 220, and a wake-up detector 230. The clock receiver 210 is configured to receive the clock signals CLKINx and detect the disable state of the clock signals CLKINx. A low voltage level indicates the clock signals CLKINx are in the disable state, and a high voltage level indicates the clock signals CLKINx are in an enable state. When the clock receiver 210 detects that each of the clock signals CLKINx has the low voltage level, it means that the clock signals CLKINx are in the disable state. The disable state indicates a display panel of the electronic device 100 operates in a blanking period PB. In the blanking period PB, the display panel does not perform a display operation. On the contrary, the display panel performs the display operation in an active period PA.

In an embodiment, the low voltage level may indicate the clock signals CLKINx are in the enable state, and the high voltage level may indicate the clock signals CLKINx are in the disable state. In this case, when the clock receiver 210 detects that each of the clock signals CLKINx has the high voltage level, it means that the clock signals CLKINx are in the disable state.

When the disable state of the clock signals CLKINx is detected, the latch circuit 220 output a control signal S2 to turn off the control circuit 112. In the present embodiment, the control circuit 112 includes a ramp comparator 310 and an error amplifier 320, and the latch circuit 220 may turn off the control circuit 112 by outputting the control signal S2 to disable the ramp comparator 310 and/or the error amplifier 320. When the control circuit 112 is turned off, the control circuit 112 does not output the control signal S1 to the power converter circuit 130, and the power converter circuit 130 stops its power conversion operation. As a result, the power consumption of the electronic device 100 can be reduced.

On the other hand, when one of the clock signals CLKINx changes to the enable state, the wake-up detector 230 wakes up the control circuit 112, so that the control circuit 112 can start to perform the power conversion operation. In the enable state, at least one of the clock signals CLKINx has the high voltage level, and the enable state indicates the display panel operates in the active period PA. For example, when the wake-up detector 230 detects that the square wave 410 of the clock signal CLKIN1 changes from the low voltage level to the high voltage level, it indicates the display panel enters the active period PA. The wake-up detector 230 wakes up the control circuit 112 when the display panel enters the active period PA. When the control circuit 112 is turned on, the control circuit 112 outputs the control signal S1 to the power converter circuit 130, and the power converter circuit 130 starts its power conversion operation.

Regarding hardware structures of the components in the embodiment of FIG. 1, enough teaching, suggestion, and implementation illustration for hardware structures of the clock transmitter 122, the clock receiver 210, the latch circuit 220, and the wake-up detector 230 can be obtained with reference to common knowledge in the related art, which is not repeated hereinafter.

Figure 3:
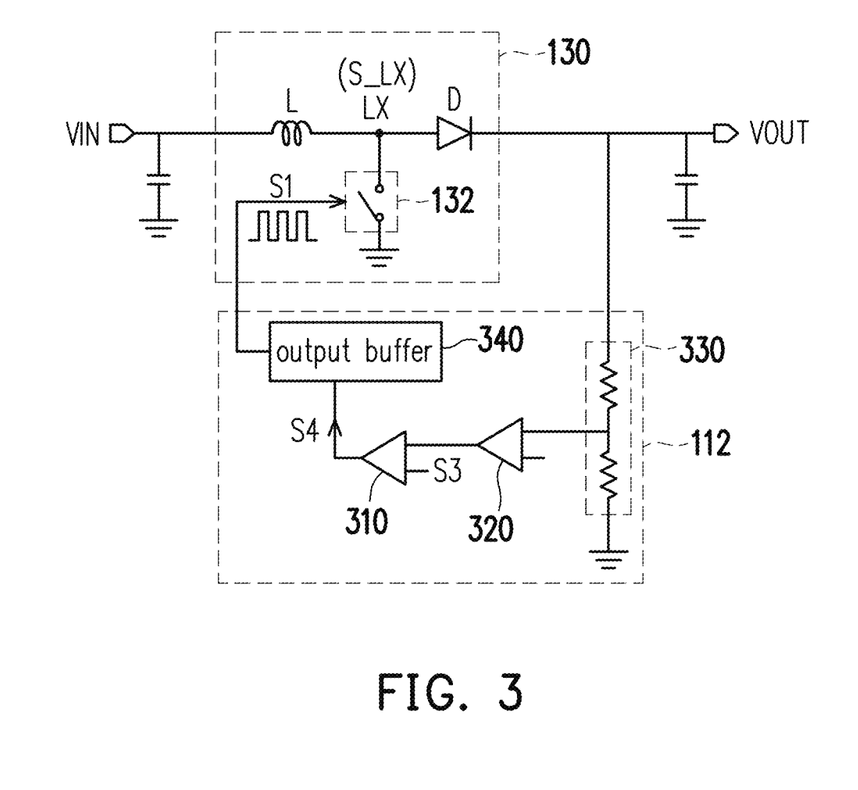
FIG. 3 is a circuit diagram illustrating the power converter circuit and the control circuit depicted in FIG. 1.

FIG. 3 is a circuit diagram illustrating the power converter circuit and the control circuit depicted in FIG. 1. Referring to FIG. 3, in the present embodiment, the power converter circuit 130 may be a booster converter, and the power converter circuit 130 boosts an input voltage VIN to an output voltage VOUT. In another embodiment, the power converter circuit 130 may be a buck converter, and the input voltage VIN is converted to a lower output voltage VOUT.

Taking the booster converter for example, the power converter circuit 130 includes an inductor L, a diode D and a switch circuit 132. The switch circuit 132 is controlled by the control signal S1 and has a switching frequency. In the present embodiment, the control signal S1 may be a PWM signal as illustrated in FIG. 3, but the invention is not limited thereto. Therefore, a switching signal S_LX is generated at a switching node LX. A frequency of the switching signal S_LX is substantially the same as the switching frequency of the switch circuit 132. In FIG. 2, since the frequency of the switching signal S_LX is much higher than the frequency of the clock signals CLKINx, compared with the clock signals CLKINx, square waves of the switching signal S_LX intensively distribute as illustrated in FIG. 2. The power conversion operation of the power converter circuit 130 is sufficiently taught and suggested from common knowledge in the related art, and therefore no further description is provided herein.

On the other hand, the control circuit 112 further includes a feedback detector 330 and an output buffer 340. The feedback detector 330 detects the output voltage VOUT, and outputs a detection result to the error amplifier 320. The error amplifier 320 amplifies the detection result, and outputs an amplified signal to the ramp comparator 310. The ramp comparator 310 compares the amplified signal with a reference signal S3, e.g. a ramp signal, and outputs a comparison result. The comparison result may be a PWM signal S4. The output buffer 340 enhances a driving capability of the PWM signal S4 to serve as the control signal S1. In the present embodiment, the blanking detecting circuit 114 may disable the ramp comparator 310 and/or the error amplifier 320 for power saving in the blanking period PB.

Figure 4:
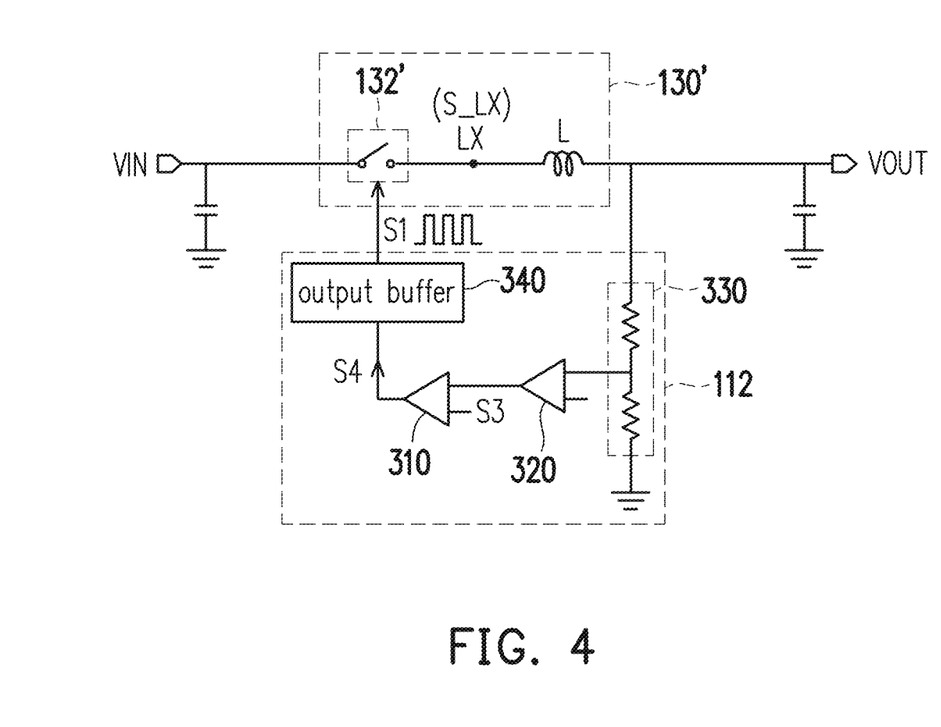
FIG. 4 is a circuit diagram illustrating the power converter circuit and the control circuit according to an embodiment of the invention.

FIG. 4 is a circuit diagram illustrating the power converter circuit and the control circuit according to an embodiment of the invention. Referring to FIG. 4, in the present embodiment, the power converter circuit 130' may be a buck converter, and the input voltage VIN is converted to a lower output voltage VOUT.

The power converter circuit 130' includes an inductor L and a switch circuit 132'. The switch circuit 132' is controlled by the control signal S1. In the present embodiment, the control signal S1 may be a PWM signal as illustrated in FIG. 4, but the invention is not limited thereto. The frequency of the switching signal S_LX is substantially the same as the switching frequency of the switch circuit 132'. The power conversion operation of the power converter circuit 130' is sufficiently taught and suggested from common knowledge in the related art, and therefore no further description is provided herein. In the present embodiment, the blanking detecting circuit 114 may disable the ramp comparator 310 and/or the error amplifier 320 for power saving in the blanking period PB.

Figure 5:
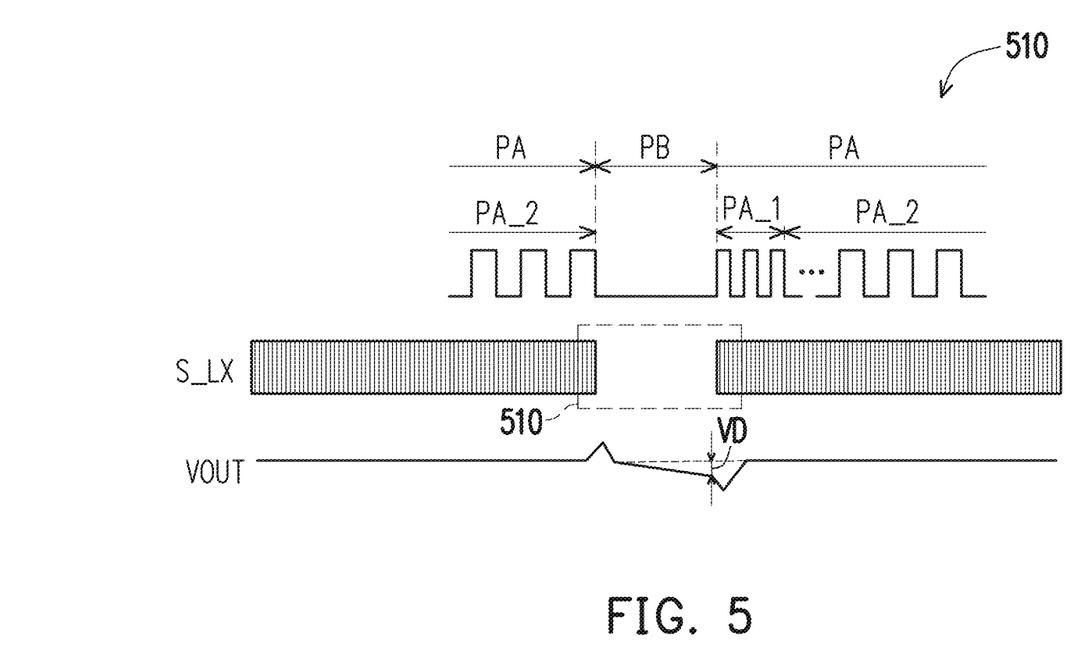
FIG. 5 is a waveform diagram illustrating the switching signal and the output voltage according to an embodiment of the invention.

FIG. 5 is a waveform diagram illustrating the switching signal and the output voltage according to an embodiment of the invention. Referring to FIG. 5, a part 510 of the switching signal S_LX is zoom-in to clearly show some square waves. The active period PA includes an initial period PA_1 and a normal period PA_2 after the initial period PA_1.

During the initial period PA_1, the blanking detecting circuit 114 sets the frequency of the switching signal S_LX as a first frequency f1. During the normal period PA_2, the blanking detecting circuit 114 sets the frequency of the switching signal S_LX as a second frequency f2, wherein the first frequency f1 is higher than the second frequency f2. In the present embodiment, the blanking detecting circuit may set the frequency of the switching signal S_LX by adjusting a frequency of the reference signal S3.

In a case of heavy load, since the switching node LX may locate in a floating state during the initial period PA_1, a voltage drop VD of the output voltage VOUT is generated when the switching signal S_LX initially enters the active period PA. To reduce the voltage drop VD, the blanking detecting circuit 114 sets the switching signal S_LX to have the higher first frequency f1 during the initial period PA_1.

Figure 6:
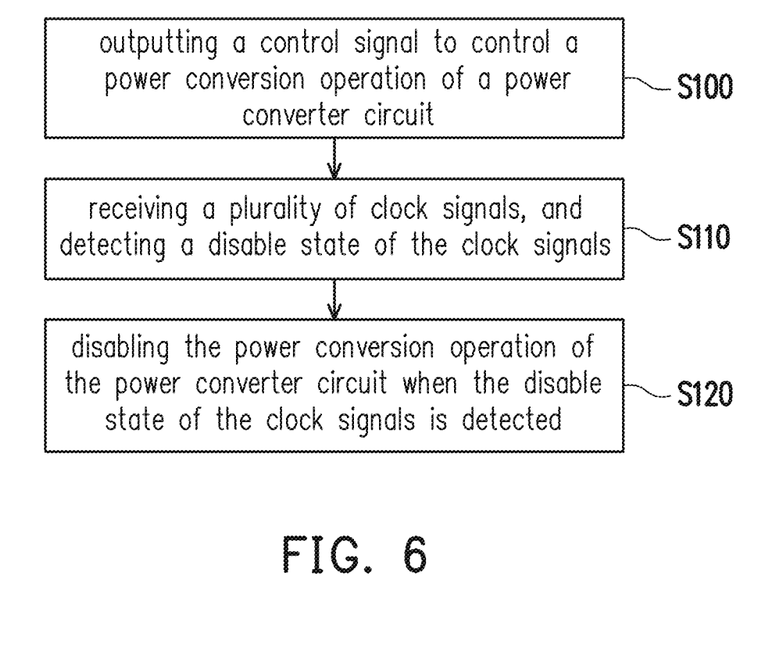
FIG. 6 is a flowchart illustrating steps in a power management method according to an embodiment of the invention.

FIG. 6 is a flowchart illustrating steps in a power management method according to an embodiment of the invention. Referring to FIG. 1 and FIG. 6, in the present embodiment, the power management method is at least adapted to the electronic device 100 depicted in FIG. 1, but the disclosure is not limited thereto.

Taking the electronic device 100 for example, in step S100, the control circuit 112 outputs a control signal to control a power conversion operation of a power converter circuit 130. In step S110, the blanking detecting circuit 114 receives a plurality of clock signals CLKINx from the timing controller 120, and detects a disable state of the clock signals CLKINx. In step S120, the blanking detecting circuit 114 disables the power conversion operation of the power converter circuit 130 when the disable state of the clock signals CLKINx is detected.

The power management method described in the embodiment of the invention is sufficiently taught, suggested, and embodied in the embodiments illustrated in FIG. 1 to FIG. 5, and therefore no further description is provided herein.

In summary, the blanking detecting circuit in the embodiments of the invention is designed to detect the disable state of the clock signals. Upon detecting this disable state, it means that the display panel is operating in the blanking period. In the blanking period, the display panel is deactivated. The control circuit is turned off and does not output the control signal to the power converter circuit, and the power converter circuit stops its power conversion operation in the blanking period. Consequently, the power consumption of the electronic device can be reduced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A power management circuit, comprising:
a control circuit, configured to output a control signal to control a power conversion operation of a power converter circuit; and
a blanking detecting circuit, coupled to the control circuit, and configured to receive a plurality of clock signals, detect a disable state of the clock signals, and turn off the control circuit when the disable state of the clock signals is detected,
wherein the control circuit comprises a ramp comparator and an error amplifier, and the blanking detecting circuit turns off the control circuit by disabling the ramp comparator and/or the error amplifier.

2. The power management circuit according to claim 1, wherein in the disable state, each of the clock signals has a low voltage level.

3. The power management circuit according to claim 1, wherein the disable state indicates a display panel operating in a blanking period.

4. The power management circuit according to claim 1, wherein when one of the clock signals changes to an enable state, the blanking detecting circuit wakes up the control circuit.

5. The power management circuit according to claim 4, wherein in the enable state, at least one of the clock signals has a high voltage level.

6. The power management circuit according to claim 4, wherein the enable state indicates a display panel operating in an active period.

7. The power management circuit according to claim 6, wherein during an initial period of the active period, the blanking detecting circuit sets a frequency of a switching signal of the power converter circuit as a first frequency higher than a second frequency.

8. The power management circuit according to claim 7, wherein during a normal period of the active period, the blanking detecting circuit sets the frequency of the switching signal of the power converter circuit as the second frequency.

9. The power management circuit according to claim 7, wherein the control circuit comprises the ramp comparator for receiving a reference signal, and the blanking detecting circuit sets the frequency of the switching signal of the power converter circuit by adjusting a frequency of the reference signal.

10. A power management method, adapted to control a power conversion operation of a power converter circuit, the power management method comprising:
outputting a control signal to control the power conversion operation of the power converter circuit;
receiving a plurality of clock signals, and detecting a disable state of the clock signals by a blanking detecting circuit; and
disabling the power conversion operation of the power converter circuit when the disable state of the clock signals is detected,
wherein the step of disabling the power conversion operation of the power converter circuit comprises:
disabling a ramp comparator and/or an error amplifier of a control circuit by the blanking detecting circuit, wherein the blanking detecting circuit is configured to turn off the control circuit when the disable state of the clock signals is detected,
wherein the control circuit is configured to output the control signal to control the power conversion operation of the power converter circuit.

11. The power management method according to claim 10, wherein in the disable state, each of the clock signals has a low voltage level.

12. The power management method according to claim 10, wherein the disable state indicates a display panel operating in a blanking period.

13. The power management method according to claim 10, further comprising:
when one of the clock signals changes to an enable state, enabling the power conversion operation of the power converter circuit.

14. The power management method according to claim 13, wherein in the enable state, at least one of the clock signals has a high voltage level.

15. The power management method according to claim 13, wherein the enable state indicates a display panel operates in an active period.

16. The power management method according to claim 15, further comprising:
during an initial period of the active period, setting a frequency of a switching signal of the power converter circuit as a first frequency higher than a second frequency.

17. The power management method according to claim 16, further comprising:
during a normal period of the active period, setting the frequency of the switching signal of the power converter circuit as the second frequency.

18. The power management method according to claim 16, wherein in the step of setting the frequency of the switching signal of the power converter circuit, the switching of the switching signal of the power converter circuit is set by adjusting a frequency of a reference signal.

* * * * *